Sept. 22, 1970 W. J. DAILEY ET AL 3,530,469
ENERGY IMPINGEMENT DEVICE
Filed June 26, 1968 2 Sheets-Sheet 1

William J. Dailey,
George W. Morgan,
INVENTORS.

BY Sidney Magnes
Agent

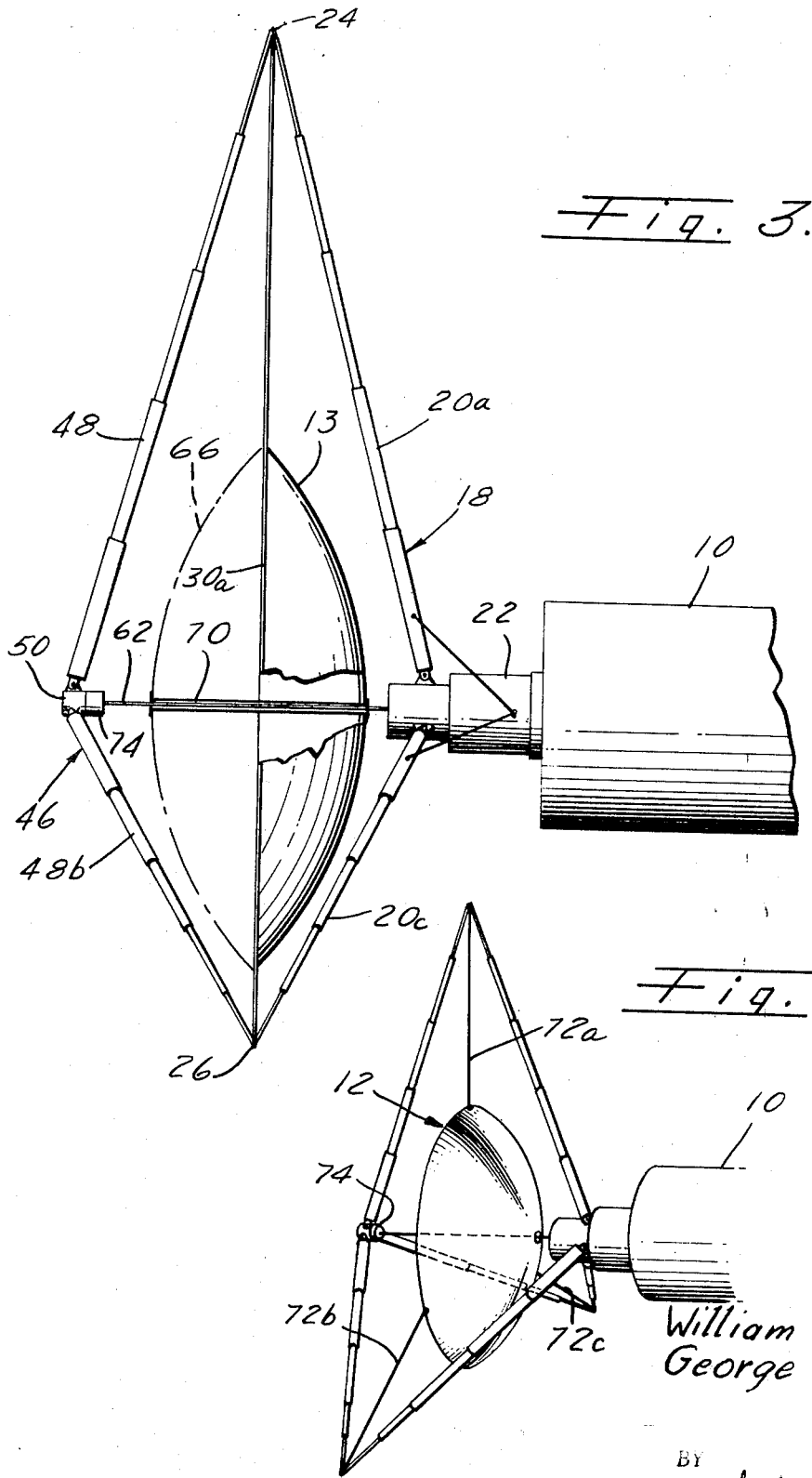

United States Patent Office 3,530,469
Patented Sept. 22, 1970

3,530,469
ENERGY IMPINGEMENT DEVICE
William J. Dailey, Santa Fe Springs, and George W. Morgan, Anaheim, Calif., assignors to North American Rockwell Corporation, a corporation of Delaware
Filed June 26, 1968, Ser. No. 740,147
Int. Cl. H01q *15/14, 15/20*
U.S. Cl. 343—18     23 Claims

ABSTRACT OF THE DISCLOSURE

The space-age requires many improved and new devices—including lightweight reflectors, solar-arrays, solar-wings, etc. This disclosure describes a new lightweight structure for these devices. When used as a reflector, it comprises a concave rigidized reflective film, positioned and attached at the center of a planar film of plastic or a planar network of support cables known as a tension-structure. The tension-structure is, in turn, attached to the ends of extended telescopic poles that are mounted in a tripod manner. When the ends of the poles are spread apart, the tension-structure assumes a planar configuration, and supports and positions the reflector in a simple, efficient manner that obviates strains and warping. Thus, the reflector-structure may be transported in a compacted form, and deployed to its desired size in space. The other devices are produced in a similar manner.

BACKGROUND

In space activities—particularly those using space vehicles, space-stations, and the like—it becomes extremely necessary to be able to carry on long-distance communication and tracking operations. So far, the most satisfactory method of doing this is to use radio waves, although lightbeams are finding increased usefulness. In any case, it is desirable to catch as much of the impinging radiation as possible; and this indicates the use of huge reflectors that may be sixty feet in diameter, or larger—the energy caught by these reflectors being concentrated, and fed to utilization equipment (or, in the case of transmitters, the energy directed outward toward a receiver).

It is obviously impossible to carry huge reflectors of this size aboard a spacecraft; so the trend has been to use inflatable arrangements that can be transported in a compact form, and later deployed, in space, to their full size.

This inflatable approach has not been completely satisfactory, for a number of reasons. Among these reasons are the following. Most of the deploying structures have been quite heavy and massive; and the reflectors generally had to be supported at several points—the many support-points introduced the problem of "thermal" growth, wherein certain support-elements expanded when heated by the sun, this usually-unequal expansion tending to warp the reflector from its desired shape.

OBJECTS AND DRAWINGS

It is therefore the principal object of the present patent application to provide an improved lightweight reflector, particularly for space use.

The attainment of this object and others will be realized from the following detailed description, taken in conjunction with the drawings, of which FIG. 1 shows one embodiment of the reflector and support-structure in the deployed state;

FIG. 3 shows the reflector and its support-structure in a "prestabilized" state; and FIG. 4 shows another embodiment of the reflector and its support-structure in a deployed, stabilized state.

DESCRIPTION

Figure 1:
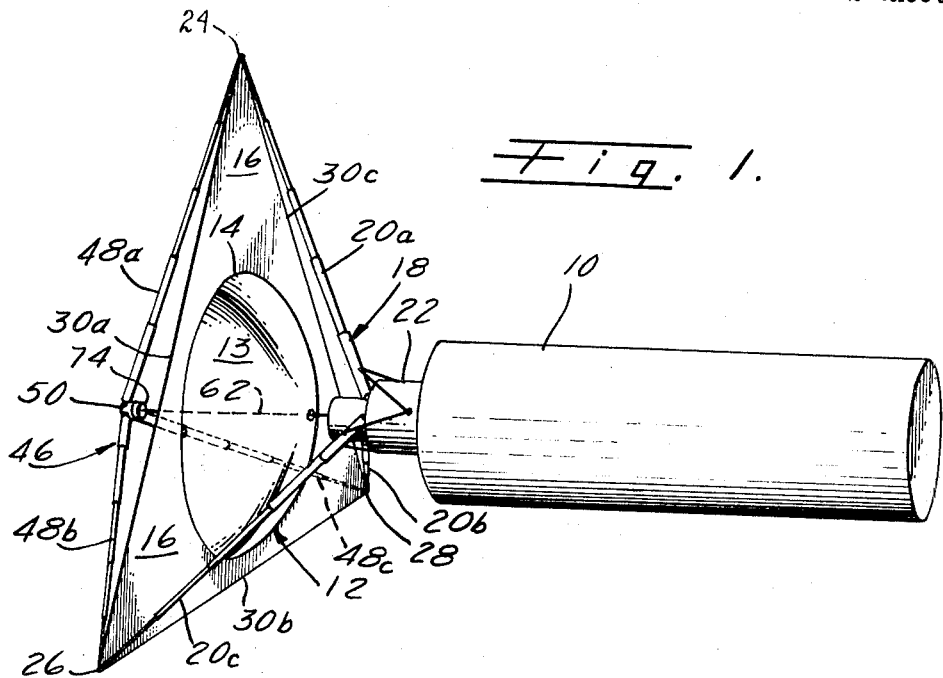

FIG. 1 shows a deployed space-reflector that is attached to a space vehicle 10, of any suitable type, that may use the disclosed reflector. Basically, the reflector 12 comprises a concave plastic film or structure 13 that is made reflective by metallizing or some other suitable process. Reflector 12 has a rim-portion, or periphery 14, that is affixed to a support-membrane 16, that is—in turn—supported by a primary tripod-type support-structure 18. As indicated, support-structure 18 comprises three extensible corner-elements 20a, 20b, and 20c; these corner-elements being shown as an extensible telescopic structure, but which may take other forms if desired. The first, proximal, ends of corner-elements 20 are fastened, by means such as a universal-mounting 22, to the space vehicle 10; the universal mounting attaching corner-elements 20 in a limited-pivotable or hinged manner. The outer, second, or distal, ends of corner-elements 20 are attached—at attachment, or support, points 24, 26, and 28—to support-means, such as a membrane 16; and, if desired, to a plurality of support-elements such as edging cables 30a, 30b, and 30c that form the edges of, and help position support membrane 16. It will be noted that the tripod-type support-structure 18 is such that its distal ends define a plane that is free to reorient itself with any movement or thermal growth of any of the corner-elements; and that the support-membrane 16 is always, and inherently, a planar configuration.

The foregoing explanation was presented in terms of a continuous plastic membrane 16, but it is apparent that other materials may be used. For example, the planar membrane may be replaced by a sheet of reticulated plastic having network of embedded fibers, by a membrane of the fiber-reinforced-plastic type, by a porous sheet of fabric, by a network of cables, or the like.

It will be realized that if the corner-elements 20a, 20b, and 20c have their distal ends spread apart by any suitable means (to be discussed later), support-membrane 16 will be stretched—that is, it will become a tension structure, in the above-mentioned plane. As such, each portion of tension-structure 16 is substantially continuously affixed to rim 14, and will pull radially on rim 14 of the reflector; and, if it is desired to equalize stresses on rim portion 14, the rim may comprise a peripheral cable, or loop to provide uniform stress at all portions thereof. The loop may be formed of a flexible material, such as nylon or rope; alternatively, the rim itself may be rigidized or hemmed—or in some other case, it might be desirable that the loop be a wire. Thus, the above-described structure forms a concave reflector that is suitably deployed and supported in space.

The disclosed reflector structure has an important advantage that may be understood from the following discussion. Concave reflectors—such as 16—are normally supported at their center; and the periphery of the reflector tends to sag, this distortion becoming worse as the antenna rotates or "nods." It is an unfortunate characteristic of these large antennas that there is much more effective reflecting surface near their periphery than near their center; so that the sag-distortion does a great deal of harm in changing the shape and reflecting characteristics of the antenna.

The disclosed antenna has the advantage that it is supported at its peripheral rim; and—therefore—sag, if any, would occur at the central portion. Since the central portion has a relatively small area, is quite rigid, and—in this illustration—is in a zero-gravity environment, the sag problem is insignificant.

It will also be noted that if thermal growth or any other factor changes the length of any of the corner-elements, the plane of the support-membrane 16 is merely oriented a little differently; but is not warped or distorted. The absence of distortion permits the reflector to retain its desired reflective characteristic; and the re-orientation of the support-membrane plane is such that it may be readily corrected, thus continuing to aim the reflector in the desired direction.

The previous description has been given in terms of a set of three extensible corner-elements that form a tripod-like arrangement; and it may be seen that the corner-elements 20 and the support-membrane 16 coact to form a "trihedral" pyramid—i.e., one that has a triangular base. This base, which is formed by the support-membrane 16, will be called the "basal" plane of the pyramid.

It is obvious that more than three corner-elements may be used, if so desired; but a larger number of corner-elements introduces the problem of establishing, and maintaining, a basal-plane without distortion in the presence of thermal growth or other conditions—since three points establish a plane, all others are redundant, and introduce additional complexities.

It was pointed out above that the corner-elements 20a, 20b, and 20c of the first pyramid 18 are to be spread apart; and one way of doing this is shown in FIG. 1. The spreading-means in this illustration comprises a second trihedral-pyramid 46; this one comprising corner-elements 48a, 48b, and 48c—these also being extensible units as discussed previously. The first, proximal, ends of the second set of corner-elements are connected together by means of a universal-mounting 50, in a limited-pivotable or hinged manner as described previously; and the second, distal, outer ends of the second set of corner-elements 48 are connected to support or attachment-points 24, 26, and 28. The attachment-points may take any convenient form; one, for example, being a hinged arrangement for the distal ends of the corner-elements—the hinge having a loop, hoop, etc., for receiving either the tension-structure itself or the supporting-cables 30.

It will be seen that the second set of corner-elements also forms a trihedral pyramid that has a basal-plane defined by support-membrane 16. Thus, the first and second pyramids form a base-to-base pyramidal configuration having a common basal-plane comprising a tension-structure 16 that contains reflector 12.

Of course, other spreading means may be used; for example, springs acting upon corner-elements 20a, 20b, 20c—or a spring-loaded universal mounting 22.

Thus, when the structure is deployed, reflector 12 is securely held by tension-membrane 16; which is, in turn, securely positioned by the pyramidal arrangement.

THE STOWED CONFIGURATION

Figure 2:
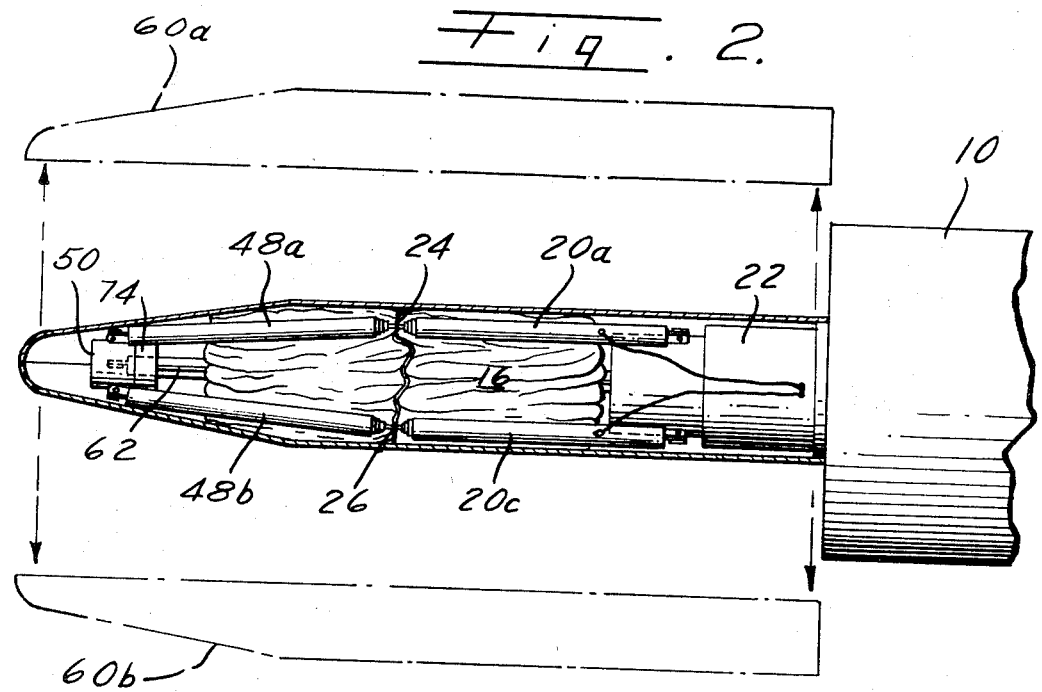
FIG. 2 shows the reflector and its support-structure in a "stowed" state.

FIG. 2 shows the "stowed" arrangement wherein the reflector and its supporting structure are compactly folded within a cover that—prior to deployment— is jettisoned in the form of two or more pieces 60a and 60b. As may be seen in FIG. 2, corner-element sets 20 and 46 are telescoped their minimum length; each set of corner-elements having its respective distal ends attached to the other set's distal ends at attachment points 24, 26, and 28—the proximal ends of the sets 20 and 46 being mounted on universal-mountings 22 and 50. A tension-structure 16 is shown positioned between attachments points 24 and 28, and being folded into the central portion of the package.

FIG. 2 also shows a tightening cable 62 attached to universal mounting 50, traversing reflector 12 and universal mounting 22, and then entering space vehicle 10. This tightening-cable will be discussed later.

DEPLOYMENT

FIG. 3 shows a "pre-stabilization" state of the deployment process. At this time, the covers (60a and 60b of FIG. 2) have been jettisoned as indicated above; the spring-loaded corner-elements have been "de-telescoped" to their desired length—established by locking pins, pawls and ratchets, spring-loaded detents or the like; and means, such as springs in the universal mountings, have assured that the universal mountings 22, 50, are spaced apart by a suitable distance.

Now, tightening cable 62 is progressively pulled into the space-vehicle, or an attachment thereto—in this way producing a distance-reducing force on universal-mounting 50, and causing it to move toward the space-vehicle. At a given condition (determined by the length, the tension, or some other characteristics of tightening-cable 62) the tightening-cable 62 is locked in that position; thus stabilizing the overall reflector-structure, and applying suitable tension to tension-structure 16, and to the rim 14 of the reflector. It will be noted that the corner-elements are in compression, whereas practically all of the other elements are in tension.

FORMING THE REFLECTOR

It will be recalled that support-membrane 16 and the reflector material were compacted in the stowed configuration; but upon deployment, they form a plane between attachment-points 24, 26, and 28. In order to form reflector 12, it is originally made as a two-layer structure. The rearward layer 13 (see FIG. 3) may be a thin film of plastic such as Mylar, that is metallized or otherwise treated in order to act as a good reflector; the film being "space-hardenable" or supported on a space-hardenable substrate, as will be discussed later. Some of these films are hardened or rigidized by means of a gelatin film whose moisture evaporates in space. Other films rigidize when their surface is heated by the sun, still other films are rigidized by a foaming action.

The front layer, 66, is formed of a "photolyzable" material (developed by Goodyear Aerospace, Akron, Ohio) that disintegrates in space—by the combination of vacuum, temperature, ultraviolet radiation, and/or other phenomenon. Alternatively, the front surface 66 may be formed of a material that is transparent to the radiation.

Numerous such films are known to personnel working in this field, and are discussed in many publications— among which are "Expandable Structures for Space Applications" by F. W. Forbes; and "Aerospace Expandable Structures" (Defense Documentation Center Publication Nos. 607,541 and 432,006 respectively).

In any case, the volume between mirror-surface 13 and front-surface 66 is now inflated, using a compressed gas system or sublimating powders placed within the folded assembly—the powders, when sublimed, developing sufficient vapor pressure for inflation. Thus, reflector-surface 13 assumes the desired concave shape—be it spherical, paraboloidal, or the like.

It will be noted that in FIG. 3, a sealed tube 70 pierces the center of the reflector; and this sealed tube is provided for the following reason. When the "reflector volume" is inflated to its desired shape, provision must be made for preventing gas leakage around tightening-cable 62 that passes through the center of the reflector 12. Sealed tube 70 permits the passage of the tightening-cable; and still provides a toroidal shape for the reflector volume; thus permitting the proper inflation, in the presence of the tightening-cable. Once sealed-tube 70 has performed its function, it may be rigidized or disintegrated as described above.

ANOTHER EMBODIMENT

FIG. 4 shows another embodiment that is substantially similar to that previously described, the difference being that the original planar support-membrane 16 has been eliminated, and its function replaced by a planar support-structive comprising tension-cables 72a, 72b, and 72c— which are attached to peripheral-cable 40, or alternatively, to the rigidized rim of reflector 12. Reflector 12 thus has, in effect, a three-point suspension. It is apparent that the arrangement of FIG. 4 is functionally the same as that previously described.

ENERGY TRANSMISSION

It was previously pointed out that reflector 12 was to handle radiation such as radio waves or light. To achieve this function, reflector 12 acts as an antenna, and is ordinarily of a conclave shape with a radiation conversion 74 positioned at or near the focal point of the reflector. In FIG. 4 (and in the other embodiments) reflector 12 is substantially on, and perpendicular to, the longitudinal axis between universal-mountings 22 and 50; so that its focal point is on the tightening-cable 62. In FIG. 4 a conversion-element 74 is positioned at the focal-point of the reflector; and the impinging radiation—whether radio waves or lightbeams—focuses onto conversion-element 74, which is of a type to convert the focussed radiation into suitable signals that are then transmitted to utilization equipment associated with the space-vehicle.

In some applications when the reflector is to be used for transmitting rather than for receiving, the conversion-element directs suitable radiation to the reflector, which then directs the radiation toward a target.

In order for the conversion-element 74 to efficiently direct/receive radiation, it should be at a focal-point of the reflector; and this result may be readily achieved by placing conversion-element 74 on the tightening-cable 62. Thus, as the reflector-structure is stabilizing the reflector-structure, is stabilized by tightening-cable 62, conversion-element 74 is automatically positioned.

Tightening-cable 62 has been described as a cable for stabilizing the reflector-structure, for positioning universal mounting 50, and for positioning the feed-element 74; but it may readily comprise a cable (such as a coaxial or electric cable) that is additionally capable of transmitting a signal between conversion-element 74 and utilization apparatus in the space-vehicle. Therefore, tightening-cable 62 may serve a triple function namely, deployment of the reflector, positioning the conversion-element, and the transmission of signals between the reflector and the utilization equipment aboard the space-vehicle.

While the preceding discussion was presented in terms of mirror-antennas for space use, similar devices—such as solar-panels, solar-wind sails, etc.—may be produced in accordance with the above teachings. In these cases it may not be necessary to have a concave reflective surface. Therefore, in order to include such devices within the scope of the invention, the term "energy impingement device" will be used, and is to be so construed.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:
1. An assembly comprising:
   a primary support-structure having only three primary support-points and means for maintaining said points in substantially mutually fixed relationship for causing said three support-points to establish a plane;
   an impingement device; and
   means, connected between said support-points and the periphery of said device, for supporting said device from said three primary support-points with said periphery in said plane for causing minor movement of any primary support-point to merely establish a new plane that still contains said periphery.

2. The combination of claim 1 wherein said support means comprises a planar secondary support-structure positioned substantially in the plane established by said primary support-points.

3. The combination of claim 2 wherein said planar secondary support-structure comprises support-elements comprising edging-cables connecting each primary support-point to the other primary support-points.

4. The combination of claim 2 wherein said planar secondary support-structure comprises supporting-elements comprising strengthened edges of said planar secondary support-structure.

5. The combination of claim 1 wherein support-means comprises a tertiary support-structure substantially continuously-connected to said periphery.

6. The combination of claim 1 wherein said support-means comprises a planar support-structure extending from said primary support-points to the periphery of said device.

7. The combination of claim 6 wherein said planar support-structure comprises a network of cables.

8. The combination of claim 6 wherein said planar support-structure comprises a reticulated material.

9. The combination of claim 6 wherein said planar support-structure comprises a fabric.

10. The combination of claim 6 wherein said planar support-structure comprises a plastic membrane.

11. An assembly comprising:
   (A) a primary support-structure having at least three primary support-points and means for maintaining said points in substantially mutually fixed relation—whereby said three support-points establish a plane;
   (B) an impingement device; and
   (C) means, connected between said support-points and the periphery of said device, for supporting said device from said primary support-points with said periphery in said plane for causing minor movement of any primary support-point to merely establish a new plane that still contains said periphery;
      (a) said support means comprising a planar secondary support-structure having a plurality of support-elements interconnecting said primary support-points, said support-elements comprising a plastic membrane having edging-cables;
      (b) said support-means further comprise a tertiary support-structure substantially continuously connected to said periphery.

12. The combination comprising:
   a first pyramidal configuration having a first set of extensible corner elements;
   means for mounting the first ends of said first set of corner-elements in a limited-pivotable manner;
   means for spreading the second ends of said first set of corner-elements, the second ends of said first set of corner-elements defining the basal-plane of said first pyramidal configuration;
   a reflector having a rim; and
   means for positioning said rim in said basal-plane.

13. The combination of claim 12 wherein said last means comprises a tension-structure attached between said rim and said second ends of said first set of corner-elements—whereby said rim and said tension-structure are all in said basal-plane.

14. The combination of claim 13 wherein said tension-structure comprises a support membrane.

15. The combination of claim 13 wherein said tension-structure comprises tension-cables.

16. The combination comprising:
   a first pyramidal configuration having a first set of extensible corner elements;
   means, comprising a first universal-mounting, for mounting the first ends of said first set of corner-elements in a limited-pivotable manner;
   means for spreading the second ends of said first set of corner-elements, the second ends of said first set of corner-elements defining the basal-plane of said first pyramidal configuration;
   said spreading-means comprising a second pyramidal configuration having a second set of extensible corner-elements, and means comprising a second universal mounting for mounting the first ends of said second set of corner-elements in a limited-pivatable manner, the second ends of said second set of corner-elements defining the basal-plane of said second pyramidal configuration;

means for attaching the second ends of said first set of corner-elements to the respective second ends of said second set of corner-elements, to cause said two basal-planes to form a common basal-plane, and to produce a base-to-base composite pyramidal configuration;

a concave reflector having a rim; and means for positioning said rim in said common basal-plane.

17. The combination of claim 16 wherein said last means includes tension-structure attached between said rim and said second ends of said sets of corner elements.

18. The combination of claim 17 wherein said tension-structure comprises a support membrane.

19. The combination of claim 17 wherein said tension-structure comprises tension cables.

20. The combination of claim 17 including
means, comprising a tightening-element connected between said universal-mountings, for applying a distance-reducing force between said mountings, for further extending said attached second ends.

21. The combination of claim 17 including means to direct/receive energy reflected at said reflector.

22. The combination of claim 17 wherein said sets comprises three corner-elements, and said composite pyramidal configuration forms two base-to-base trihedral pyramids.

23. The combination comprising:
a first pyramidal configuration having a first set of telescopic corner-elements;

means, comprising a first universal-mounting, for the first ends of said first set of corner-elements in a limited-pivotable manner;

means for spreading the second ends of said first set of corner-elements, the second ends of said first set of corner-elements defining the basal-plane of said first pyramidal configuration;

said spreading-means comprising a second pyramidal configuration having a second set of telescopic corner-elements, and means comprising a second universal mounting for mounting the first ends of said second set of corner-elements in a limited-pivotable manner, the second ends of said second set of corner-elements defining the basal-plane of said second pyramidal configuration;

means for attaching the second ends of said first set of corner-elements to the respective second ends of said second set of corner-elements, to cause said two basal-planes to form a common basal-plane, and to produce a base-to-base composite pyramidal configuration;

a concave reflector having a rim;

means for positioning said rim in said common basal-plane, said means comprising a tension-structure attached between said rim and said second ends of said sets of corner elements;

means, comprising a tightening-element connected between said universal-mountings, for applying a distance-reducing force between said mountings, for further extending said attached second ends;

conversion means, positioned substantially at a focal-point of said reflector to direct/receive energy reflected at said reflector.

References Cited

UNITED STATES PATENTS

| | | |
|---|---|---|
| 2,763,002 | 9/1956 | Fitzgerald et al. |
| 2,806,134 | 9/1957 | Tarorci. |
| 3,220,004 | 10/1965 | Gillespie. |
| 3,326,624 | 6/1967 | Van Maydell et al. _ 343—915 X |

FOREIGN PATENTS

| | | |
|---|---|---|
| 717,034 | 6/1961 | Germany. |

RODNEY D. BENNETT, Jr., Primary Examiner

B. L. RIBANDO, Assistant Examiner

U.S. Cl. X.R.

343—915